United States Patent
Tanaka et al.

(10) Patent No.: US 11,030,421 B2
(45) Date of Patent: Jun. 8, 2021

(54) MULTILINGUAL COMMUNICATION SYSTEM AND MULTILINGUAL COMMUNICATION PROVISION METHOD

(71) Applicant: LOVELAND CO., LTD., Tokyo (JP)

(72) Inventors: Hatsumi Tanaka, Tokyo (JP); Masumi Miyasaka, Tokyo (JP)

(73) Assignee: LOVELAND CO., LTD., Tokyo (JP)

(*) Notice: Subject to any disclaimer, the term of this patent is extended or adjusted under 35 U.S.C. 154(b) by 0 days.

(21) Appl. No.: 16/314,964

(22) PCT Filed: Jan. 17, 2017

(86) PCT No.: PCT/JP2017/001373
§ 371 (c)(1),
(2) Date: Jan. 3, 2019

(87) PCT Pub. No.: WO2018/134878
PCT Pub. Date: Jul. 26, 2018

(65) Prior Publication Data
US 2019/0205397 A1    Jul. 4, 2019

(51) Int. Cl.
*G06F 40/10* (2020.01)
*G06F 40/58* (2020.01)
(Continued)

(52) U.S. Cl.
CPC ............ *G06F 40/58* (2020.01); *H04L 51/046* (2013.01); *H04L 67/104* (2013.01)

(58) Field of Classification Search
CPC ...... G06F 17/289; G06F 17/28; G06F 17/275; G06F 17/2836; G06F 16/95; G06F 9/454;
(Continued)

(56) References Cited

U.S. PATENT DOCUMENTS 5,715,466 A * 2/1998 Flanagan ................ G06F 40/58
704/5
5,987,401 A * 11/1999 Trudeau .............. H04L 12/1827
704/2
(Continued)

FOREIGN PATENT DOCUMENTS

CN    101471893 A    7/2009
CN    105335355 A    2/2016
(Continued)

OTHER PUBLICATIONS

Jun. 28, 2018 Decision to Grant a Patent issued in Japanese Patent Application No. 2018-514488.
(Continued)

*Primary Examiner* — Olujimi A Adesanya
(74) *Attorney, Agent, or Firm* — Oliff PLC

(57) ABSTRACT

A participating terminal connection unit connects a plurality of terminals participating in communication, acquires language information set for each terminal to recognize the language used in the terminal, defines for each terminal a terminal message box for the communication, in which messages are described so as to be displayable in a time-series manner, and correlates the use language of the terminal with the terminal message box. A box coupling setting unit sets coupling between first and second terminal message boxes so that a transmission message written in the first terminal message box is translated and written in the second terminal message box as a reception message. When a transmission message is written in the first terminal message box from the first terminal, a box coupling execution unit translates the transmission message according to the coupling and writes the translated message in the second terminal message box as a reception message.

13 Claims, 16 Drawing Sheets

(51) Int. Cl.
*H04L 29/08* (2006.01)
*H04L 12/58* (2006.01)

(58) Field of Classification Search
CPC ......... G06F 40/10; H04L 51/16; H04L 51/04; H04L 51/10; H04L 12/183
See application file for complete search history.

(56) References Cited

U.S. PATENT DOCUMENTS

| | | | |
|---|---|---|---|
| 6,581,066 B1* | 6/2003 | Wang Baldonado | G06F 8/38 |
| 6,816,468 B1* | 11/2004 | Cruickshank | H04L 12/1813 370/260 |
| 8,473,555 B2* | 6/2013 | Lai | G06F 40/58 709/206 |
| 9,372,672 B1* | 6/2016 | Thomas | G06F 8/40 |
| 2001/0029455 A1* | 10/2001 | Chin | G06F 17/273 704/277 |
| 2002/0022954 A1* | 2/2002 | Shimohata | G06F 17/289 704/3 |
| 2002/0194300 A1* | 12/2002 | Lin | G06F 40/58 709/217 |
| 2003/0033312 A1* | 2/2003 | Koizumi | G06F 40/58 |
| 2004/0158471 A1 | 8/2004 | Davis et al. | |
| 2004/0186706 A1* | 9/2004 | Itoh | G06F 40/211 704/10 |
| 2006/0265652 A1* | 11/2006 | Seitz | G06F 16/95 715/703 |
| 2007/0150500 A1* | 6/2007 | Kawada | G06Q 10/10 |
| 2007/0168450 A1* | 7/2007 | Prajapat | G06F 17/289 709/207 |
| 2007/0208813 A1* | 9/2007 | Blagsvedt | G06F 17/289 709/206 |
| 2007/0294078 A1* | 12/2007 | Kim | G06F 40/58 704/2 |
| 2008/0126386 A1* | 5/2008 | Gaurav | G06F 16/84 |
| 2008/0262827 A1* | 10/2008 | DeGroot | G06F 17/2827 704/3 |
| 2010/0204981 A1 | 8/2010 | Ribeiro et al. | |
| 2010/0241700 A1 | 9/2010 | Rasmussen et al. | |
| 2010/0313255 A1* | 12/2010 | Khuda | G06F 17/289 726/7 |
| 2010/0323728 A1* | 12/2010 | Gould | H04M 3/42391 455/466 |
| 2011/0046939 A1* | 2/2011 | Balasaygun | G06F 9/543 704/2 |
| 2011/0252316 A1* | 10/2011 | Pahud | G06F 17/289 715/264 |
| 2013/0144599 A1* | 6/2013 | Davis | G06F 17/275 704/2 |
| 2014/0229154 A1* | 8/2014 | Leydon | G06F 40/263 704/2 |
| 2014/0297254 A1 | 10/2014 | Yeo et al. | |
| 2014/0303961 A1* | 10/2014 | Leydon | G06F 17/28 704/2 |
| 2016/0034447 A1* | 2/2016 | Shin | G06F 17/275 704/3 |
| 2017/0344538 A1* | 11/2017 | Horai | G06F 17/2836 |
| 2018/0150458 A1* | 5/2018 | Yoon | G06F 3/0484 |
| 2019/0266248 A1* | 8/2019 | Tanaka | G06F 40/263 |

FOREIGN PATENT DOCUMENTS

| | | |
|---|---|---|
| JP | 2002-73514 A | 3/2002 |
| JP | 2003-16023 A | 1/2003 |
| JP | 2006-4296 A | 1/2006 |
| JP | 2006-146724 A | 6/2006 |
| JP | 2013-140584 A | 7/2013 |
| JP | 2014-203454 A | 10/2014 |
| JP | 2016-509312 A | 3/2016 |
| KR | 20120039514 A | 4/2012 |
| KR | 101406981 B1 | 6/2014 |
| KR | 20160017035 A | 2/2016 |
| WO | 2008/118814 A1 | 10/2008 |
| WO | 2014/197463 A2 | 12/2014 |

OTHER PUBLICATIONS

Mar. 7, 2017 International Search Report issued in International Patent Application No. PCT/JP2017/001373.
Jul. 26, 2019 Office Action issued in Chinese Patent Application No. 201780040482.5.
Jan. 30, 2020 Office Action issued in Indian Patent Application No. 201917031846.
Aug. 20, 2020 Extended European Search Report issued in European Patent Application No. 17892757.0.
Jun. 19, 2020 Hearing Notice issued in Indian Patent Application No. 201917031846.

* cited by examiner

MULTILINGUAL COMMUNICATION SYSTEM AND MULTILINGUAL COMMUNICATION PROVISION METHOD

TECHNICAL FIELD

The present invention relates to a technique of realizing communication between users who use different languages.

BACKGROUND ART

If users who use different languages can communicate using their own languages, it would be convenient because users can communicate with each other by overcoming the language barrier or without using unfamiliar languages. Chatting is an example of communication in which data such as text is transmitted between users on a real-time basis via a network using computers. PTL 1 to 4 disclose a system in which text input by users is machine-translated in languages that other users use to enable communication of a plurality of users who use different languages.

PTL 1 disclose a message exchange system for smoothly exchanging messages between users who use different languages. The message exchange system disclosed in PTL 1 recognizes an original language from key information associated with a message text transmitted by a relay server computer or the like, recognizes a target language by referring to locale information of an OS (operating system), stores setting information that defines a machine translation program selected in correspondence with the original language of the message text, outputs a translated text obtained by translating the message text from the original language to a target language desired by a receiving user. The locale information is information that defines a language environment and the like of the OS. Moreover, the message exchange system of PTL 1 may also output the original text before translation of the received message text in the original language as necessary. The technique disclosed in PTL 1 acquires the language information set to the OS to identify a language and translates chatting texts on the basis of the language information.

PTL 2 discloses a message posting system having a function of displaying an original text of chatting or the like. The message posting system disclosed in PTL 2 performs chatting via a browser and is configured such that a server acquires and stores client information, use language information, and option information such as a designated language, as necessary, of each client and outputs a translation translated in a use language to the browser of the client for all participants. The message posting system disclosed in PTL 2 may also output an original text of the received message as necessary. The technique disclosed in PTL 2 performs chatting via a browser and designates a language from the browser.

PTL 3 discloses a multilingual translation system that translates text information in a language used in a terminal device. The multilingual translation system disclosed in PTL 3 acquires locale data of a browser, extracts and stores a language set in the locale data as a use language used in the terminal device, and outputs a translation translated in the use language. The technique disclosed in PTL 3 translates a text in a language identified on the basis of the locale data of the browser.

PTL 4 discloses a system for multi-user multilingual communication. The system disclosed in PTL 4 identifies a first language and a second language, receives a message of the first language from a first person communicating in the first language, searches a data store for a first corresponding message in the second language, and transmits the first corresponding message to the second person who communicates in the second language. The language is identified by analyzing a content in a received chatting dialog or acquiring language preference or setting information from each chatting client system.

CITATION LIST

Patent Literature

[PTL 1]
Japanese Patent Application Publication No. 2006-146724
[PTL 2]
Japanese Patent Application Publication No. 2003-16023
[PTL 3]
Japanese Patent Application Publication No. 2006-4296
[PTL 4]
Japanese Translation of PCT Application No. 2016-509312

SUMMARY OF INVENTION

Technical Problem

A real-time property of a service is important in achieving smooth bidirectional communication between users. Particularly, in a system that provides translation-enabled communication, there is a problem that the real-time property deteriorates because the time elapsed until a translation of a text input by a certain user is displayed to the other user after the user inputs the text increases with the process associated with translation.

In such a conventional system as disclosed in PTL 1 to 4, the language information set to a browser or an OS of each terminal is acquired in advance to recognize the language used in each terminal, and when a text is input from a terminal, an original language and a destination language of the text are determined, and then, translation is executed. In this manner, the conventional system determines the original language of a text and a translation destination language of an input text whenever the text is input. Therefore, it takes a considerable time until the translation of a text is displayed to other users after a certain user inputs the text, and the real-time property of a service deteriorates.

One of the objects of the present invention is to provide a technique for enabling smooth communication on computers between users who use different languages.

Solution to Problem

A system according to one embodiment of the present invention is a multilingual communication system that provides translation-enabled terminal-to-terminal communication, the multilingual communication system including: a participating terminal connection unit that connects a plurality of terminals participating in the communication, acquires language information set for each of the terminals to recognize a use language used in the terminal from the language information, defines for each terminal a terminal message box for the communication, in which transmission messages from a terminal and reception messages to the terminal are described so as to be displayable in a time-series manner, and correlates the use language of the terminal with the terminal message box; a box coupling setting unit that sets coupling between a first terminal message box and a second terminal message box so that a transmission message written in the first terminal message box defined for a first terminal is translated using a use language of the first terminal message box as a translation source language and using a use language of the second terminal message box defined for a second terminal as a translation destination language and is written in the second terminal message box as a reception message; and a box coupling execution unit that, when a transmission message is written in the first terminal message box from the first terminal, translates the transmission message from the translation source language to the translation destination language according to the coupling, writes the translated transmission message in the second terminal message box as a reception message, and displays the reception message on the second terminal.

Advantageous Effects of Invention

According to the embodiment, when a terminal connects to the multilingual communication system and sets communication with a certain counterpart, the language information set to the terminal is acquired, the terminal message boxes of the respective terminals are defined, and the terminal message boxes are coupled in advance so that a message written from a first terminal is translated and is displayed on a second terminal. Due to this, when a message is written from the first terminal, the message can be translated immediately, and the translated message can be displayed on the second terminal. Therefore, users who use different languages can communicate smoothly on computers.

DESCRIPTION OF EMBODIMENTS

Hereinafter, an embodiment of the present invention will be described with reference to the drawings.

Embodiment 1

Figure 1:
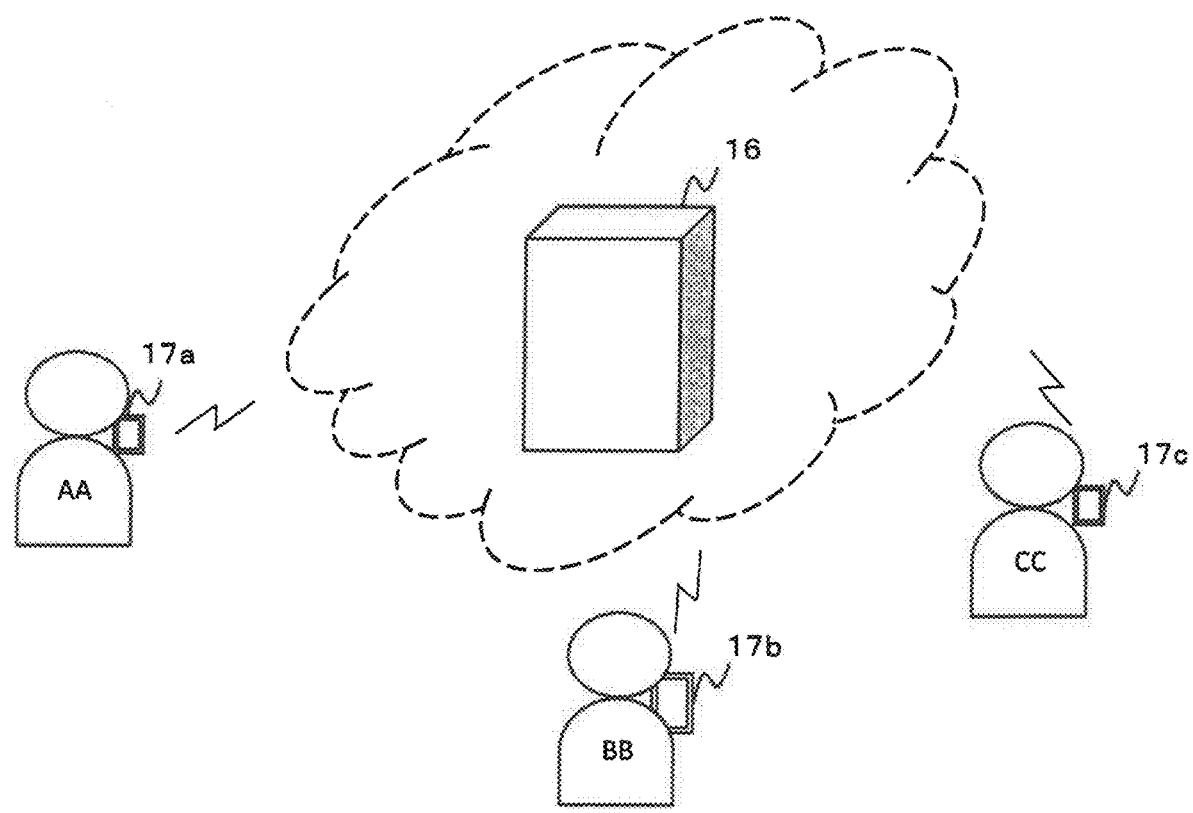
FIG. 1 is a block diagram illustrating a hardware configuration of a multilingual communication system according to Embodiment 1.

FIG. 1 is a block diagram illustrating a hardware configuration of a multilingual communication system according to Embodiment 1. A multilingual communication system 10 according to the present embodiment includes a server 16 and a plurality of terminals 17 as examples of hardware components.

The multilingual communication system 10 is a system that provides a text-based real-time chatting service on the terminal 17. Users may have one-to-one conversations and a plurality of users may converse with each other. In the example of FIG. 1, three users (AA, BB, and CC) converse with each other. Moreover, the multilingual communication system 10 has a function of translating and displaying texts and can realize communication in which users who use different languages exchange information with each other.

Figure 2:
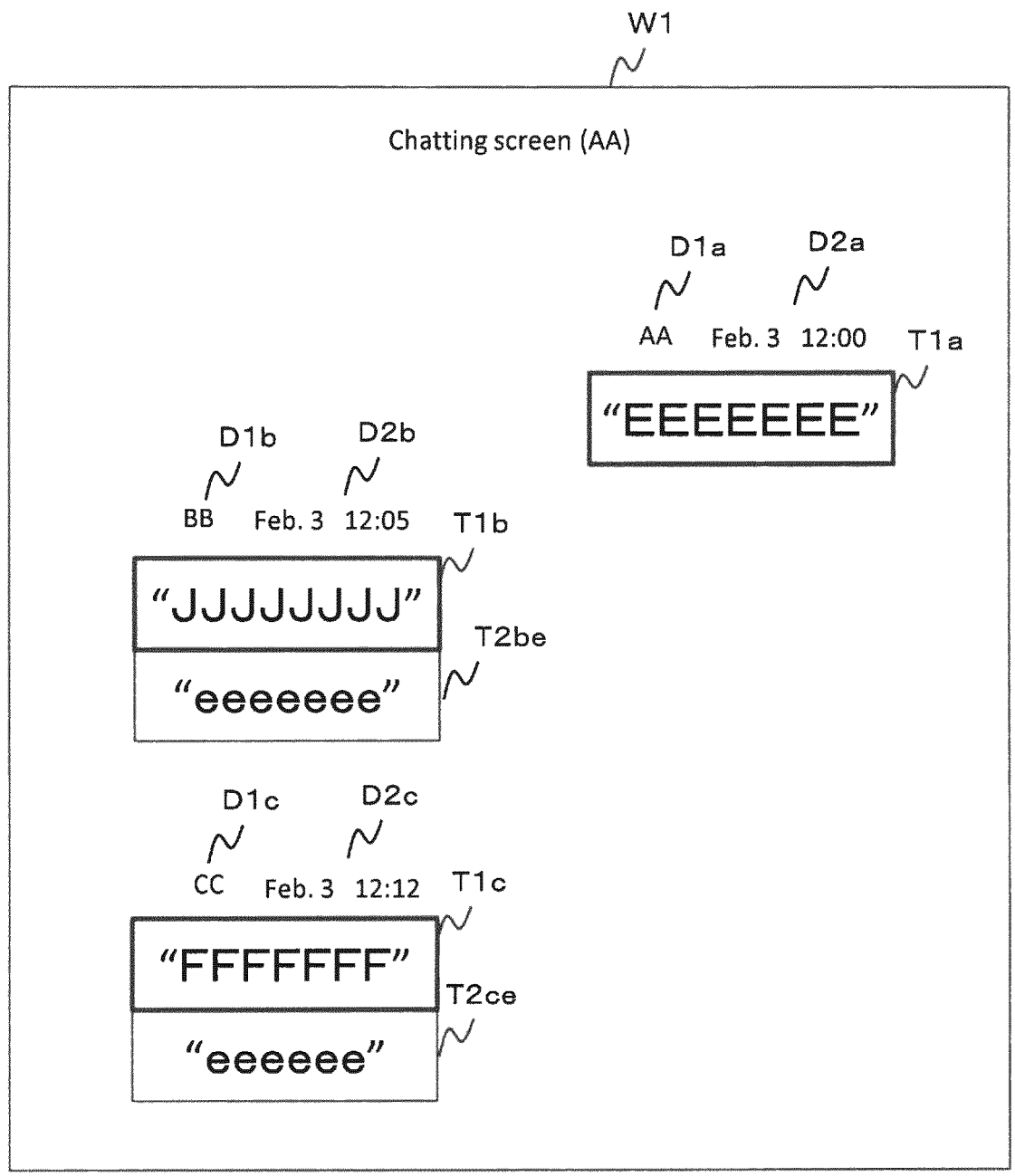
FIG. 2 is a diagram illustrating an example of a screen display of the multilingual communication system according to Embodiment 1.
Figure 3:
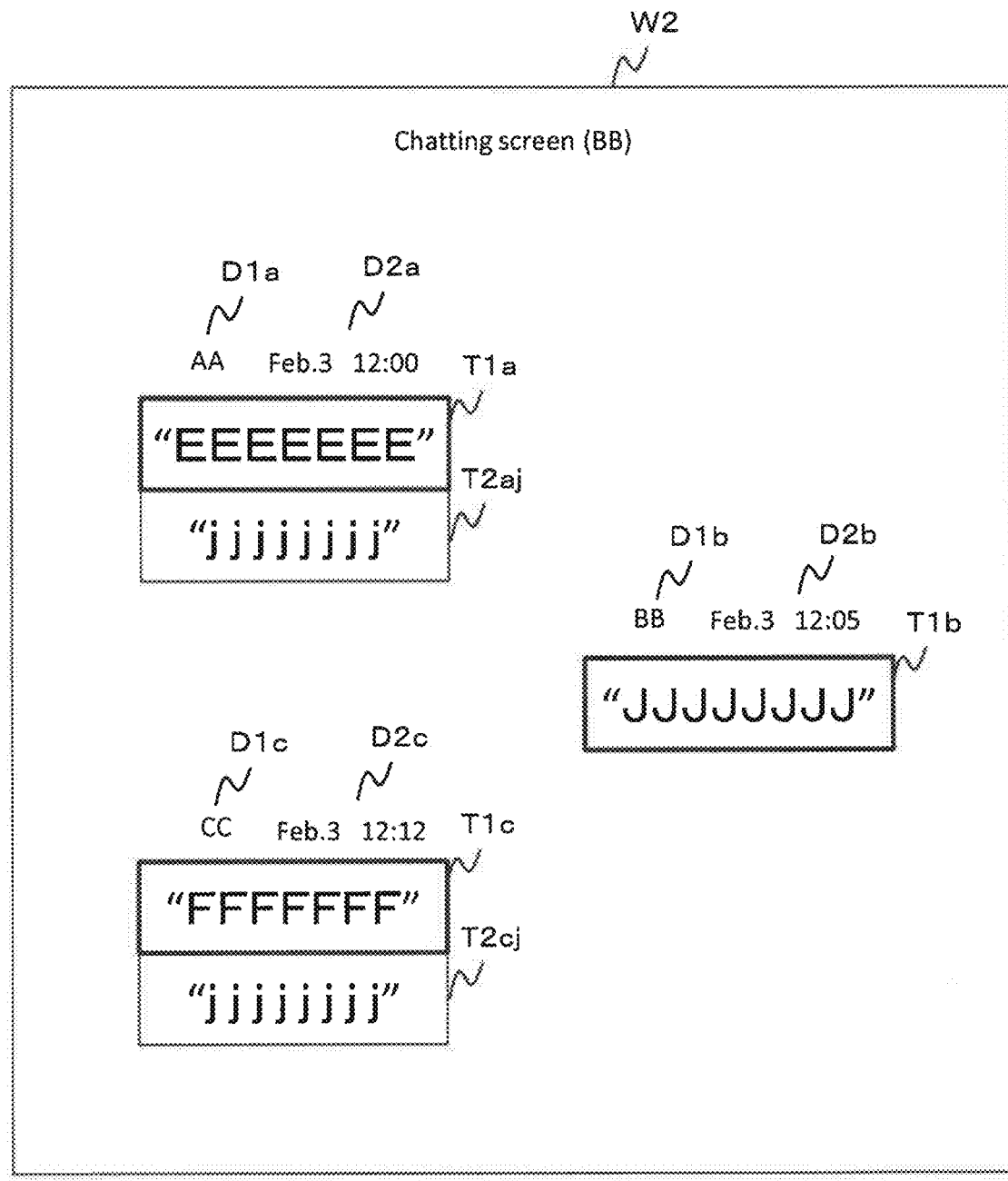
FIG. 3 is a diagram illustrating an example of a screen display of the multilingual communication system according to Embodiment 1.
Figure 4:
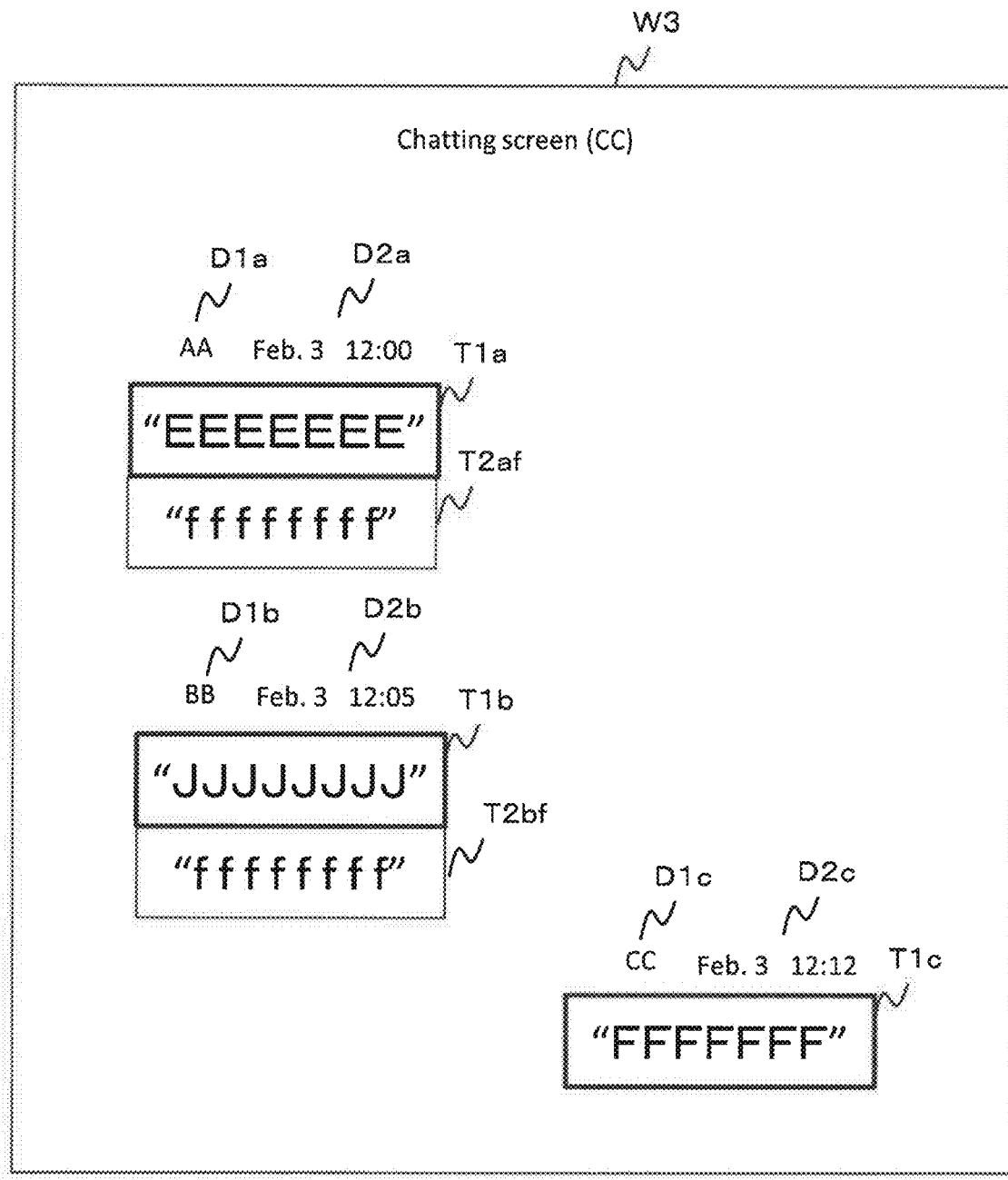
FIG. 4 is a diagram illustrating an example of a screen display of the multilingual communication system according to Embodiment 1.

FIGS. 2, 3, and 4 are diagrams illustrating an example of a screen display of the multilingual communication system according to Embodiment 1. FIG. 2 illustrates a screen displayed on the terminal 17 of the user AA. FIG. 3 illustrates a screen displayed on the terminal 17 of the user BB. FIG. 4 illustrates a screen displayed on the terminal 17 of the user CC. In this example, it is assumed that the user AA uses English, the user BB uses Japanese, and the user CC uses French.

Transmission messages and reception messages included in communication are displayed on a chatting screen from top to down in a time-series order of the writing date and time. In this example, it is assumed that the communication is chatting and the messages transmitted and received are texts. However, the present invention is not limited thereto. As another example, a document file may be included in the message. In this case, the file may be transmitted as it is and the content of the document file may be translated. Moreover, in this example, a transmission message written by the user is displayed on the right side, and reception messages written by the other users are displayed on the left side.

As illustrated in FIG. 2, an English text T1$a$ written by the user AA as well as a user name D1$a$ and a date and time D2$a$ are displayed on a chatting screen of the user AA who uses English. The date and time D2$a$ indicates 12:00, February 3. Moreover, a Japanese text T1$b$ written by the user BB and an English translation text T2$be$ thereof as well as a user name D1$b$ and a date and time D2$b$ are displayed. The date and time D2$b$ indicates 12:05, February 3. Furthermore, a French text T1$c$ written by the user CC and an English translation text T2$ce$ thereof as well as a user name D1$c$ and a date and time D2$c$ are displayed. The date and time D2$c$ indicates 12:12, February 3.

As illustrated in FIG. 3, an English text T1$a$ written by the user AA and a Japanese translation text T2$aj$ thereof as well as a user name D1$a$ and a date and time D2$a$ are displayed on the chatting screen of the user BB who uses Japanese. The date and time D2$a$ indicates 12:00, February 3. Moreover, a Japanese text T1b written by the user BB as well as a user name D1b and a date and time D2b are displayed. The date and time D2b indicates 12:05, February 3. Furthermore, a French text T1c written by the user CC and a Japanese translation text T2cj thereof as well as a user name D1c and a date and time D2c are displayed. The date and time D2c indicates 12:12, February 3.

As illustrated in FIG. 4, an English text T1a written by the user AA and a French translation text T2af thereof as well as a user name D1a and a date and time D2a are displayed on the chatting screen of the user CC who uses French. The date and time D2a indicates 12:00, February 3. Moreover, a Japanese text T1b written by the user BB and a French translation text T2bf thereof as well as a user name D1b and a date and time D2b are displayed. The date and time D2b indicates 12:05, February 3. Furthermore, a French text T1c written by the user CC as well as a user name D1c and a date and time D2c are displayed. The date and time D2c indicates 12:12, February 3.

In this way, the user AA who uses English, the user BB who uses Japanese, and the user CC who uses French can write texts in their own languages and converse with each other while seeing texts displayed on the screen in their own languages.

Although FIGS. 2, 3, and 4 illustrate an example in which both texts before and after translation are displayed as the reception message, there is not limitation thereto. As another example, only the text after translation may be displayed, and a user may select any one of both texts so that the texts are switchably displayed.

Figure 5:
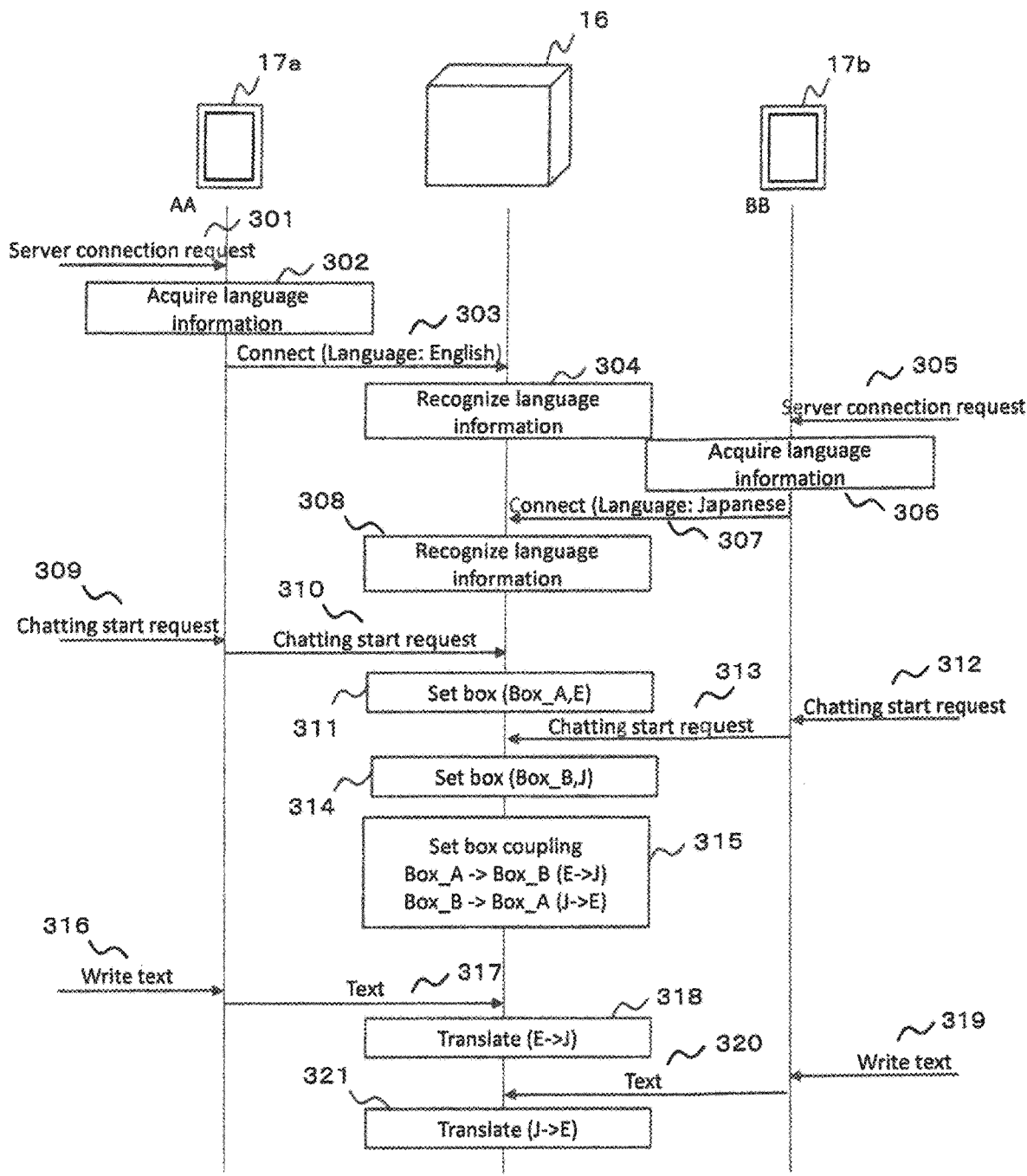
FIG. 5 is a sequence diagram illustrating exchange between devices of the multilingual communication system according to Embodiment 1.

FIG. 5 is a sequence diagram illustrating exchange between devices of the multilingual communication system according to Embodiment 1. This example illustrates a state in which a terminal 17a of the user AA and a terminal 17b of the user BB connect to the server 16 and start chatting as a two-party chatting.

When the user AA sends a connection request to the server 16 using a browser on the terminal 17a (step 301), the terminal 17a acquires the language information set in the browser (step 302) and connects to the server 16 while notifying the server 16 of the language information (step 303). In this case, the server 16 recognizes the language used in the terminal 17a (step 304).

Similarly, when the user BB sends a connection request to the server 16 using a browser on the terminal 17b (step 305), the terminal 17b acquires the language information set in the browser (step 306) and connects to the server 16 while notifying the server 16 of the language information (step 307). In this case, the server 16 recognizes the language used in the terminal 17b (step 308).

In this state, when the user AA requests the start of chatting with the user BB using the terminal 17a (step 309), the terminal 17a sends a chatting request to the server 16 (step 310). The server 16 defines a terminal message box Box_A for the chatting of the terminal 17a in which transmission messages from the terminal 17a and reception messages to the terminal 17a are described so as to be displayable in a time-series manner and correlates the use language (in this example, English) of the terminal 17a with the terminal message box Box_A (step 311). Displaying in a time-series manner means that the messages are displayed in a time-series order and does not mean that messages are recorded in a time-series order. For example, if information on a writing time point is appended to each message, the messages can be displayed in a time-series manner.

When the user BB requests the start of chatting with the user AA using the terminal 17b (step 312), the terminal 17b sends a chatting request to the server 16 (step 313). The server 16 defines a terminal message box Box_B for the chatting of the terminal 17b in which transmission messages from the terminal 17b and reception messages to the terminal 17b are described so as to be displayable in a time-series manner and correlates the use language (in this example, Japanese) of the terminal 17b with the terminal message box Box_B (step 314).

When the terminal message boxes Box_A and Box_B of the terminals 17a and 17b are provided, the server 16 couples the terminal message box Box_A and the terminal message box Box_B (step 315). This coupling involves fixing the translation source language and the translation destination language of the translation of text between terminal message boxes to create a state in which the text written in one terminal message box is translated immediately and is applied to the other terminal message box. Although the coupling is one-directional from one terminal message box to the other terminal message box, two couplings of both directions are generally set simultaneously.

When coupling from the terminal message box Box_A to the terminal message box Box_B is set, the server 16 translates the text of the transmission message written to the terminal message box Box_A defined in the terminal 17a using the use language (English) of the terminal message box Box_A as the translation source language and the use language (Japanese) of the terminal message box Box_B defined in the terminal 17b as the translation destination language and writes the translated text as the text of the reception message of the terminal message box Box_B. Moreover, when coupling from the terminal message box Box_B to the terminal message box Box_A is set, the server 16 translates the text of the transmission message written to the terminal message box Box_B defined in the terminal 17b using the use language (Japanese) of the terminal message box Box_B as the translation source language and the use language (English) of the terminal message box Box_A defined in the terminal 17a as the translation destination language and writes the translated text as the text of the reception message of the terminal message box Box_A.

After that, when the user AA writes text (step 316), the text is transmitted from the terminal 17a to the server 16 as a transmission message (step 317), and the server 16 translates the text from English to Japanese immediately (step 318). Similarly, when the user BB writes text (step 319), the text is transmitted from the terminal 17b to the server 16 as a transmission message (step 320), and the server 16 translates the text from Japanese to English immediately (step 321). Once the coupling is set, since the translation source language and the translation destination language are not changed until the coupling is canceled, the server 16 can start translation of the written text immediately.

Figure 6:
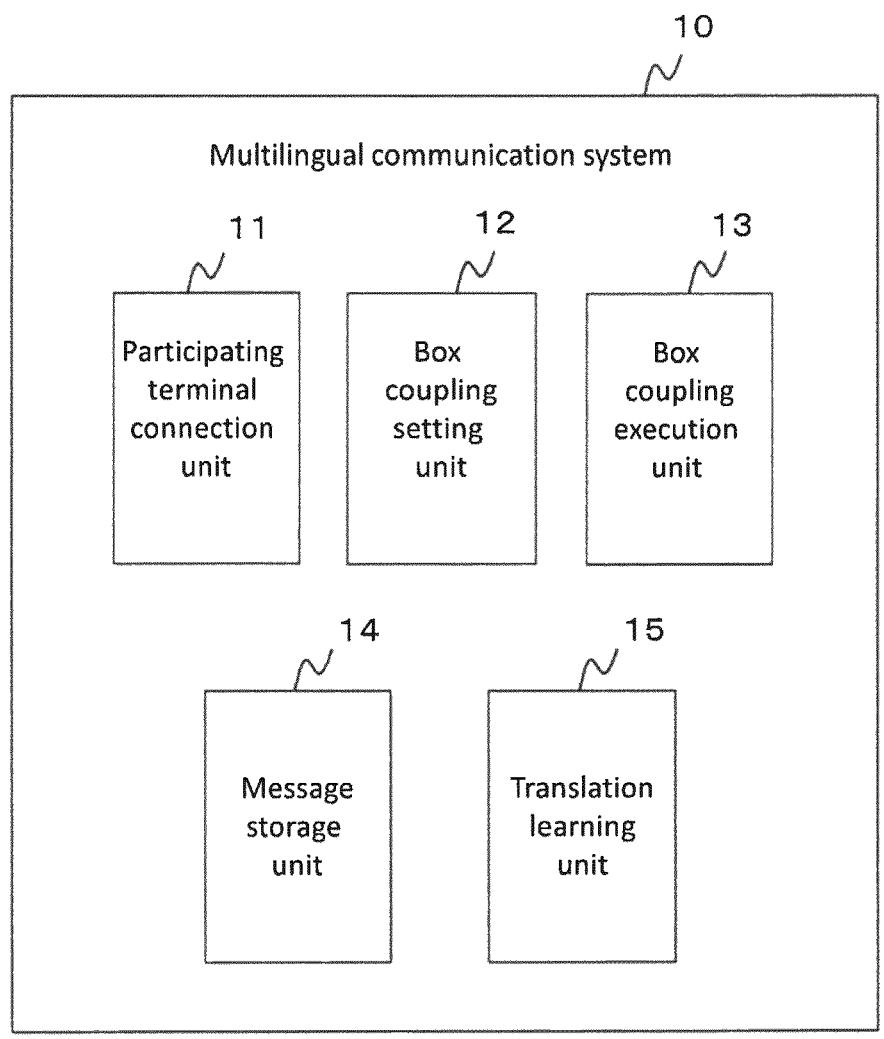
FIG. 6 is a block diagram illustrating a functional configuration of the multilingual communication system according to Embodiment 1.

FIG. 6 is a block diagram illustrating a functional configuration of the multilingual communication system according to Embodiment 1. FIG. 6 illustrates a functional block diagram illustrating a functional configuration of the multilingual communication system 10. Although main functions of the multilingual communication system 10 are arranged in the server 16, some functions may be arranged in the terminal 17 via a browser, for example.

Referring to FIG. 6, the multilingual communication system 10 includes a participating terminal connection unit 11, a box coupling setting unit 12, a box coupling execution unit 13, a message storage unit 14, and a translation learning unit 15.

The participating terminal connection unit 11 connects to a plurality of terminals 17 participating in communication and acquires the language information set for each of the terminals 17 to recognize the use language used in the terminal 17. Moreover, the participating terminal connection unit 11 defines for each terminal 17 a terminal message box for the communication, in which transmission messages from the terminal 17 and reception messages to the terminal 17 are described so as to be displayable in a time-series manner, and correlates the use language of the terminal 17 with the terminal message box.

The box coupling setting unit 12 sets coupling between a terminal message box Box_A and a terminal message box Box_B so that the transmission message written in the terminal message box Box_A (a first terminal message box) defined in the terminal 17*a* (first terminal) is translated using the use language of the terminal message box Box_A as a translation source language and using the use language of the terminal message box Box_B (a second terminal message box) defined in the terminal 17*b* (second terminal) as a translation destination language and is written in the terminal message box Box_B as a reception message.

When a transmission message is written in the terminal message box Box_A from the terminal 17*a*, the box coupling execution unit 13 translates the transmission message from the translation source language (English) to the translation destination language (Japanese) according to the coupling and writes the translated transmission message in the terminal message box Box_B as a reception message so that the reception message is displayed on the terminal 17*b*.

In this manner, according to the present embodiment, when the terminal 17 connects to the multilingual communication system 10 and sets communication with a certain counterpart, the language information set in the terminal 17 is acquired, the terminal message box of each terminal 17 is defined, and the terminal message boxes are coupled in advance so that the message written from the terminal 17*a*, for example, is translated and is displayed on the terminal 17*b*. Therefore, when a message is written from the terminal 17*a*, the message can be translated immediately and the translated message can be displayed on the terminal 17*b*.

In this case, the participating terminal connection unit 11 may acquire the language information when the terminal 17 connects to the multilingual communication system 10, and may define the terminal message box for the terminal 17 when the terminal 17 having connected to the multilingual communication system 10 sets communication with a specific counterpart. Since the language information set to the terminal 17 is acquired in advance when the terminal 17 connects to the multilingual communication system 10, it is possible to define the terminal message box quickly when the terminal 17 sets communication with a specific counterpart and to set coupling of translation between the terminal message boxes.

The participating terminal connection unit 11 acquires the language information set to the terminal 17 whenever connecting the terminal 17 to the multilingual communication system 10. Since the new language information is acquired whenever connecting the terminal 17 to the multilingual communication system 10, it is possible to automatically select the language used by the user in a latest state.

Figure 7:
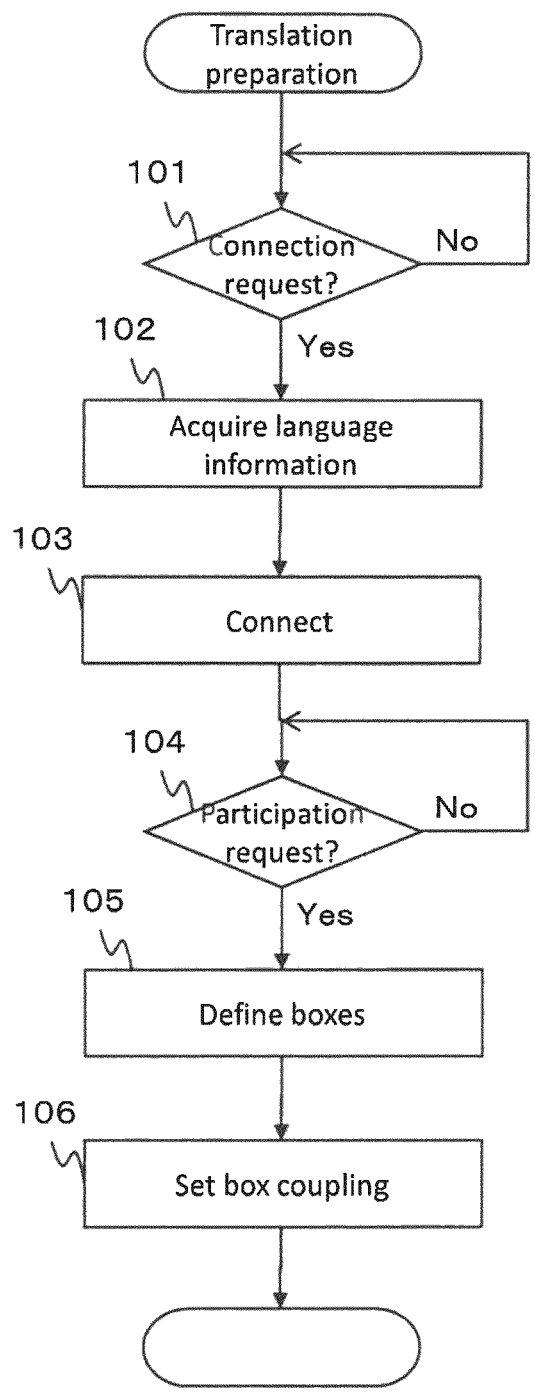
FIG. 7 is a flowchart of a translation preparation process performed by the multilingual communication system according to Embodiment 1.

FIG. 7 is a flowchart of a translation preparation process performed by the multilingual communication system according to Embodiment 1. First, the multilingual communication system 10 waits for a connection request that the user issues to the multilingual communication system 10 using the terminal 17 with the aid of the participating terminal connection unit 11 (step 101). When a connection request is received, the multilingual communication system 10 acquires the language information from the browser of the terminal 17 with the aid of the participating terminal connection unit 11 (step 102) and connects to the terminal 17 (step 103).

Subsequently, the multilingual communication system 10 waits for a request for participating in chatting which is a communication from the terminal 17 with the aid of the participating terminal connection unit 11 (step 104). When a participation request is received, the multilingual communication system 10 defines a terminal message box for the terminal 17 with the aid of the participating terminal connection unit 11 (step 105).

The multilingual communication system 10 sets coupling between the terminal message box of the terminal 17 and the terminal message box of another terminal 17 that performs communication with the terminal 17 with the aid of the box coupling setting unit 12 (step 106).

Figure 8:
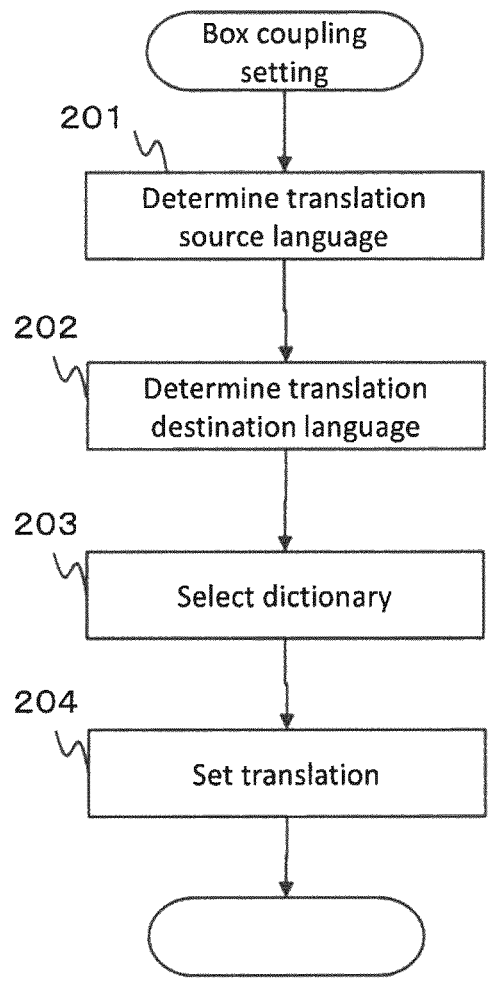
FIG. 8 is a flowchart of a details process of a box coupling setting process according to Embodiment 1.

Next, the details of the process of coupling the terminal message boxes in step 106 will be described. FIG. 8 is a flowchart illustrating a detailed process of a box coupling setting process according to Embodiment 1.

The box coupling setting unit 12 determines a translation source language by referring to the language information of a transmitting terminal 17 (step 201). Subsequently, the box coupling setting unit 12 determines a translation destination language by referring to the language information of a receiving terminal 17 (step 202). Moreover, the box coupling setting unit 12 selects a dictionary used for translation on the basis of the translation source language and the translation destination language (step 203) and performs setting such that translation is executed to display the text written from the transmitting terminal 17 on the receiving terminal 17 (step 204).

Figure 9:
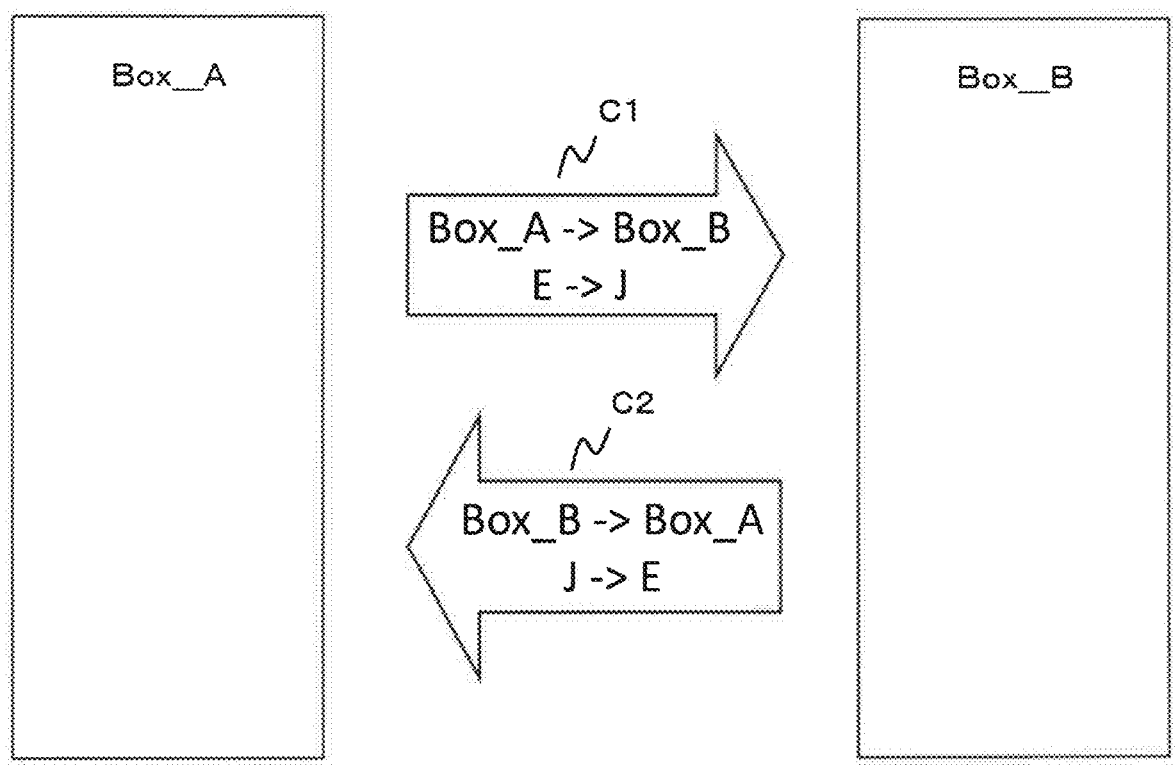
FIG. 9 is a diagram illustrating a state in which two bidirectional couplings are set according to Embodiment 1.

The box coupling setting unit 12 sets two couplings to perform bidirectional communication between the two terminals 17. FIG. 9 is a diagram illustrating a state in which two bidirectional couplings are set according to Embodiment 1.

Two couplings C1 and C2 are set between the terminal message box Box_A of the terminal 17*a* and the terminal message box Box_B of the terminal 17*b*. Translation from English (E) to Japanese (J) is set in the coupling from the terminal message box Box_A to the terminal message box Box_B. Translation from Japanese (J) to English (E) is set in the coupling from the terminal message box Box_B to the terminal message box Box_A.

While communication in which two terminals 17*a* and 17*b* have one-to-one conversations has been described, three or more terminals 17*a*, 17*b*, and 17*c* may converse with each other as illustrated in FIG. 1. For example, communication is a group chatting in which three or more users can participate, and when a new third terminal 17*c* participates in the chatting which is already set between the terminals 17*a* and 17*b*, the participating terminal connection unit 11 defines a terminal message box of the terminal 17*c* for the chatting group. The box coupling setting unit 12 sets a coupling in which the terminal message box of the terminal 17*c* is a transmitting side and the terminal message boxes of the terminals 17*a* and 17*b* are a receiving side and a coupling in which the terminal message boxes of the terminals 17*a* and 17*b* are a transmitting side and the terminal message box of the terminal 17*c* is a receiving side. Since a terminal message box and a coupling is added when a new user (the terminal 17*c*) participates in the group chatting, translation can be performed quickly when presenting the transmission message text written from the terminal 17*c* to the other terminals 17*a* and 17*b* and presenting the translation from the other terminals 17*a* and 17*b* to the terminal 17*c*.

Figure 10:
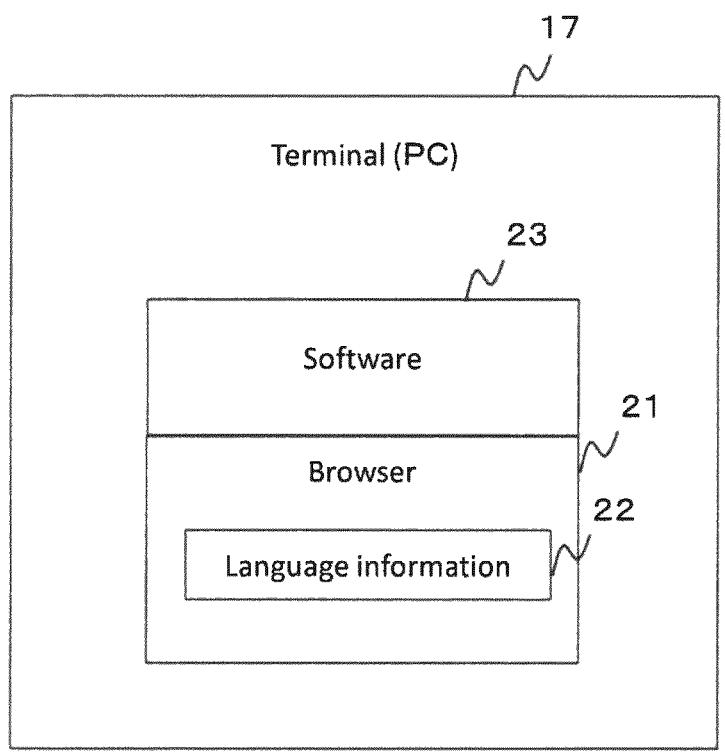
FIG. 10 is a block diagram illustrating a configuration of a terminal according to Embodiment 1.

FIG. 10 is a block diagram illustrating a configuration of a terminal according to Embodiment 1. FIG. 10 illustrates a schematic block diagram of the terminal 17 configured as a personal computer (PC). Software 23 that operates on the browser 21 is present in the terminal 17. The software 23 may not be software installed on the PC but may be deployed temporarily from the server 16 via the browser 21. Language information 22 is set in the browser 21. The software 23 acquires the language information 22 and notifies the server 16 of the language information 22.

In the terminal 17, when the software 23 operates on the browser 21 and the software 23 is executed, the participating terminal connection unit 11, at least a portion of which is implemented by the software 23, acquires the language information 22 set in the browser 21 of the terminal 17 and connects the terminal 17 to the multilingual communication system 10. Since the software 23 acquires the language information 22 from the browser 21 of the terminal 17, the language used by the user can be automatically recognized even when the user does not perform a language designating operation. For example, chatting can be performed in different languages by operating browser-based software on the PC.

Figure 11:
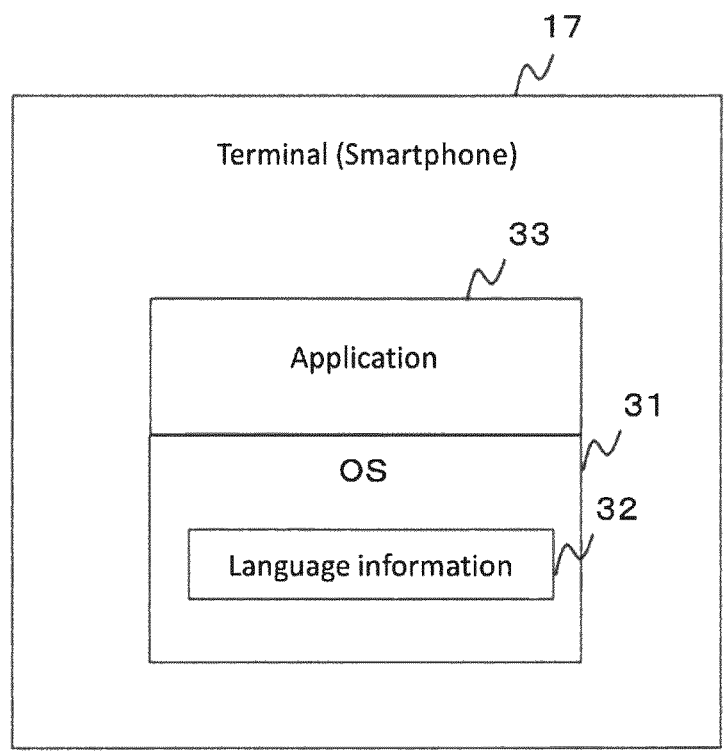
FIG. 11 is a block diagram illustrating a configuration of another terminal according to Embodiment 1.

FIG. 11 is a block diagram illustrating a configuration of another terminal according to Embodiment 1. FIG. 11 illustrates a schematic block diagram of the terminal 17 configured as a smartphone. Application software 33 that operates on an operating system (OS) is installed in the terminal 17. Examples of the OS of the smartphone include Android (registered trademark) and iOS (registered trademark).

The application 33 that operates on the OS 31 is installed in the terminal 17. When the application 33 is activated in the terminal 17, the participating terminal connection unit 11, at least a portion of which is implemented by the application 33, acquires language information 32 set to the operating system 31 of the terminal 17 and connects the terminal 17 to the multilingual communication system 10. Since the application software acquires the language information 32 from the OS 31 of the terminal 17, the use language of the user can be automatically recognized before the user starts writing a text even when the user does not perform a language designating operation. For example, by installing a native application on the OS in the smartphone, chatting can be performed in different languages.

Figure 12:
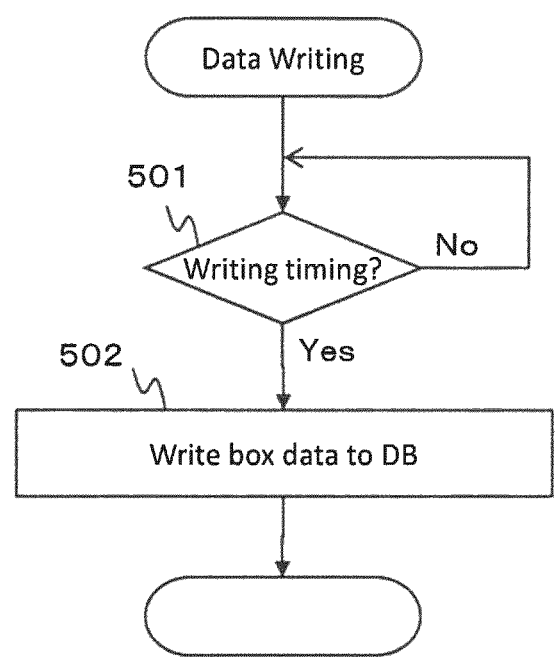
FIG. 12 is a flowchart illustrating a data writing process according to Embodiment 1.

FIG. 12 is a flowchart illustrating a data writing process according to Embodiment 1.

First, the message storage unit 14 waits until a predetermined writing timing comes (step 501). The writing timing is a timing which is not synchronous with writing of a text in a terminal message box and a method of determining the timing is not particularly limited. For example, the writing timing may come at predetermined intervals, and it may be determined that the writing timing has come when the amount of accumulated message data reaches a predetermined value. When it is determined that the writing timing has come, the message storage unit 14 writes data including the text written to the terminal message box or the text from other terminals 17 and a translated text thereof, and various pieces of information added to these texts in a database (step 502).

In this manner, the message storage unit 14 records the data of messages described in the terminal message box so as to be displayable in a time-series manner collectively in a database (not illustrated) at predetermined timings that are not synchronous with the writing timing. Since the messages written from the terminal 17 are recorded collectively in the database asynchronously with the writing, it is possible to suppress decrease in responsiveness resulting from a delay in a translation process when users write messages.

Figure 13:
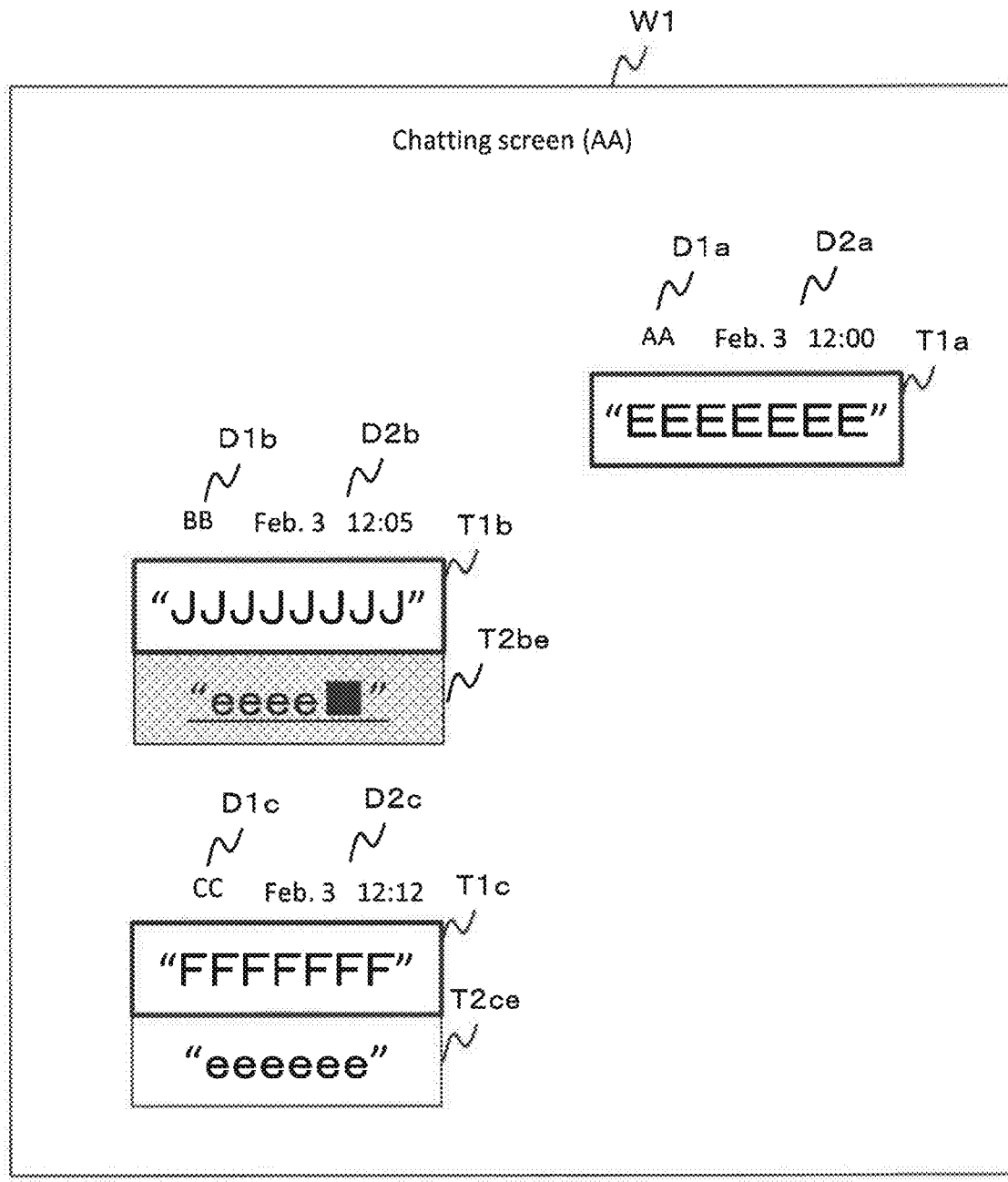
FIG. 13 is a diagram illustrating how a translation is corrected according to Embodiment 1.

For example, the reception message on the terminal message box Box_B displayed on the terminal 17*b* can be corrected from the terminal 17*b*. FIG. 13 is a diagram illustrating how a translation is corrected according to Embodiment 1. In the example of FIG. 13, an English translation text T2*be* of the Japanese text T1*b* written by the user BB, which is a reception message, is being corrected. When the reception message is corrected, the message storage unit 14 stores translation correction data which correlates a message that is the reception message before translation, a reception message before correction, and a reception message after correction in a database (not illustrated). Dictionary data mentioned herein may include data that defines a translation method as well as data that correlates words of both languages. When a translation is corrected by a user, since the correction is stored in a database, it is possible to analyze the correction and apply the analysis result to a dictionary or the like to improve translation accuracy.

The translation learning unit 15 analyzes data that the box coupling execution unit 13 has stored in a database to update dictionary data that the box coupling execution unit 13 uses for translation. The correction of the translation by users may be fed back to dictionary data by a learning function to improve translation accuracy.

Figure 14:
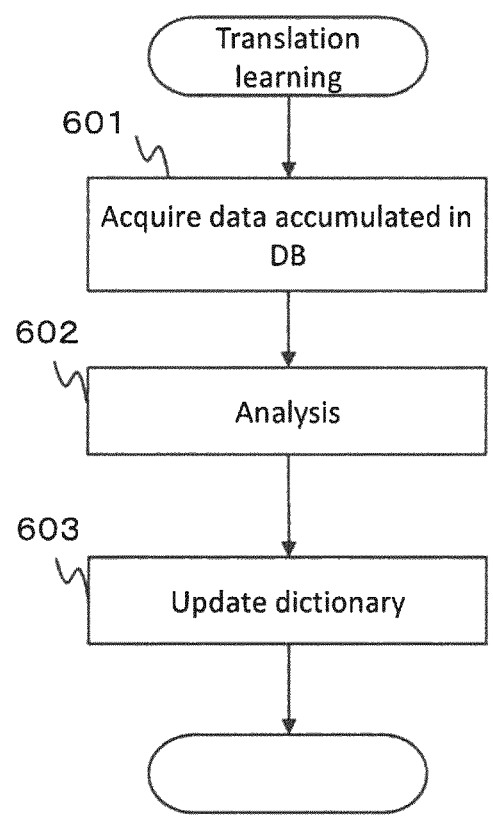
FIG. 14 is a flowchart illustrating a translation learning process according to Embodiment 1.

FIG. 14 is a flowchart illustrating a translation learning process according to Embodiment 1. The translation learning unit 15 extracts (step 601) and analyzes (step 602) translation correction data stored in the database. The translation learning unit 15 updates the dictionary data on the basis of the analysis result (step 603).

It is not necessary to store the terminal message boxes in separate storage areas. For example, information for identifying terminal message boxes may be appended to pieces of message data so that the pieces of message data can be stored in a separable manner. For example, the terminal message box may be a virtual box defined such that a message written by a user is appended with at least one of user information indicating a user who has written the message and terminal information indicating a terminal in which the message is written, date and time information indicating a date and time on which the message was written, a translation flag indicating whether the message is translated or not, and information on a translation source language and a translation destination language if the message was translated, so that a terminal message box associated with each message and a time-series order of the messages can be understood. By defining a virtual box which is a data storage area, it is possible to execute different processes for respective terminal message boxes and store message data efficiently without storing the same in a distributed manner.

In this case, the box coupling setting unit 12 may generate screen data for displaying the transmission messages and the reception messages in a time-series manner on the basis of the terminal information, the date and time information, and the translation flag appended to the transmission message and the reception message and display a screen based on the screen data on the terminal 17.

While a basic configuration and operation of the embodiment of the present invention has been described, the present embodiment can be modified in various ways.

Embodiment 2

Embodiment 1 illustrates an example in which data is written from a terminal message box to a database asynchronously with the user writing texts in the terminal message box. However, the present invention is not limited thereto. As another example, data may be written from a terminal message box to a database when a user does not write data in the terminal message box.

Hereinafter, different portions between Embodiments 1 and 2 will be mainly described.

Figure 15:
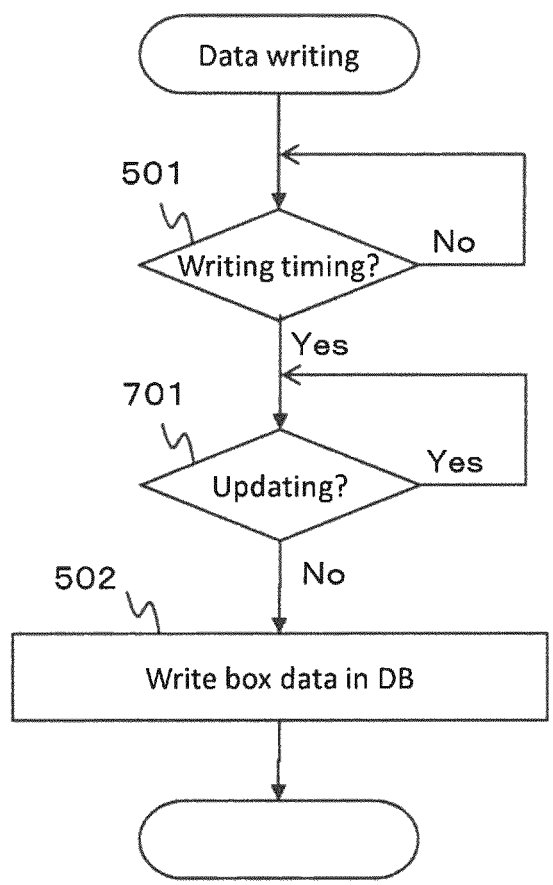
FIG. 15 is a flowchart illustrating a data writing process according to Embodiment 2.

FIG. 15 is a flowchart illustrating a data writing process according to Embodiment 2. First, the message storage unit 14 waits until a predetermined writing timing comes (step 501). A method of determining the writing timing is not particularly limited. For example, the writing timing may come at predetermined intervals, and it may be determined that the writing timing has come when the amount of accumulated message data reaches a predetermined value.

When it is determined that the writing timing has come, the message storage unit 14 determines whether a text has been written from the terminal 17 to the terminal message box (that is, the terminal message box has been updated) (step 701).

When the terminal message box is being updated, the message storage unit 14 waits until the updating ends. When the terminal message box is not being updated, the message storage unit 14 writes data including a text written to the terminal message box, translated texts of the texts written from the other terminals 17, and various pieces of information appended to these pieces of texts in a database (step 502).

In this manner, the message storage unit 14 records the data of messages described in the terminal message box so as to be displayable in a time-series manner collectively in a database at predetermined timings different from the writing timing. Since the messages written from the terminal 17 are recorded collectively in the database at timings different from the writing timing, it is possible to suppress decrease in responsiveness resulting from a delay in a translation process when users write messages.

Embodiment 3

Embodiment 1 illustrates an example in which, when the terminal 17 connects to the server 16, the language information set to the terminal 17 is acquired and is sent to the server 16. However, the present invention is not limited thereto. Embodiment 3 illustrates an example in which, when a request to start communication with another terminal 17 is received from a connected terminal 17, the language information set to the terminal 17 is acquired and is sent to the server 16.

Hereinafter, different portions between Embodiments 1 and 3 will be mainly described.

Figure 16:
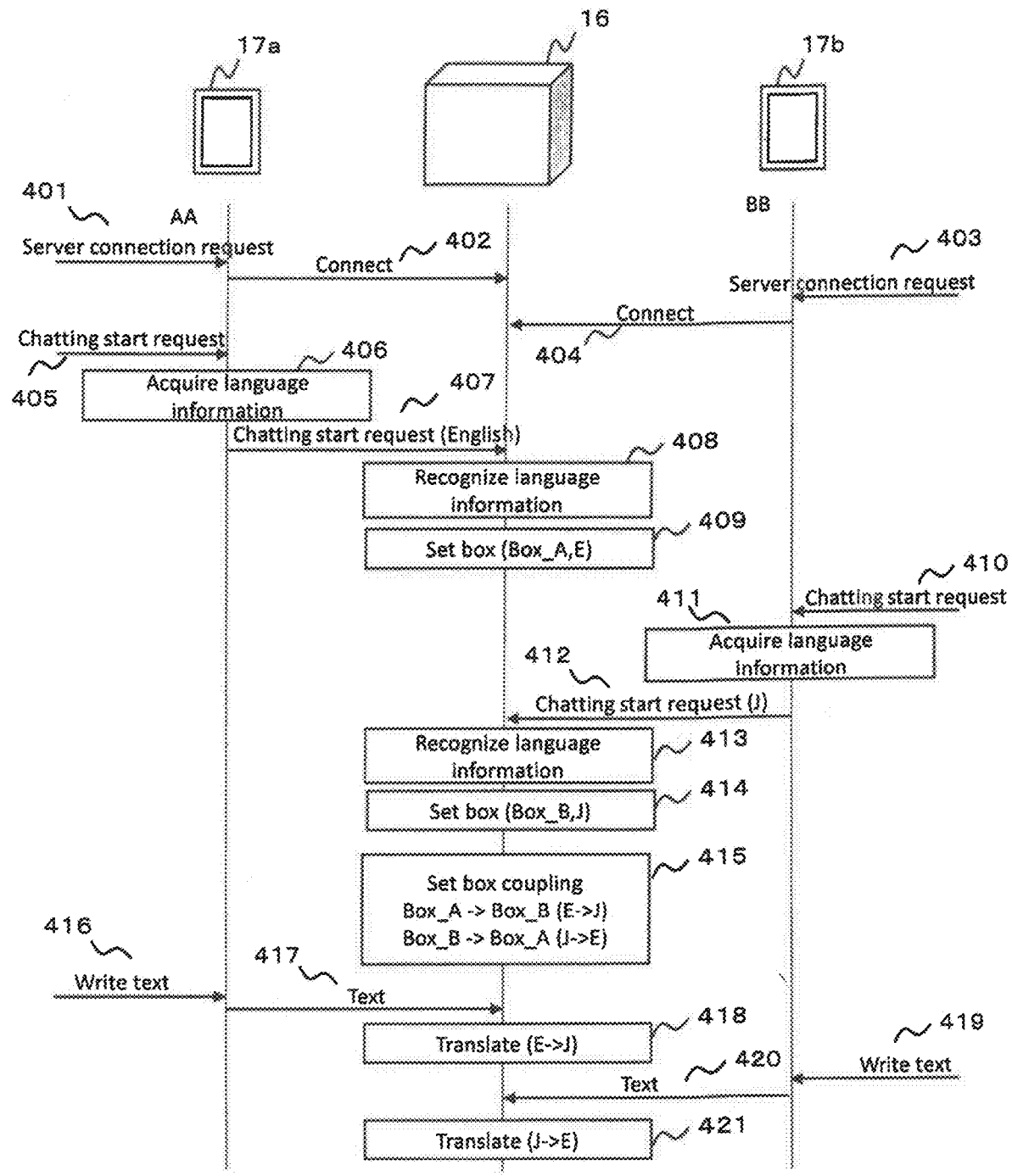
FIG. 16 is a sequence diagram illustrating exchange between devices according to Embodiment 3.

FIG. 16 is a sequence diagram illustrating exchange between devices according to Embodiment 3. In this example, a state in which a user AA and a user BB connect to the server 16 to start chatting is illustrated.

When the user AA sends a request for connection to the server 16 via a browser using the terminal 17a (step 401), the terminal 17a connects to the server 16 (step 402). Similarly, when the user BB sends a request for connection to the server 16 via a browser using the terminal 17b (step 403), the terminal 17b connects to the server 16 (step 404).

In this state, when the user AA requests the start of chatting with the user BB using the terminal 17a (step 405), the terminal 17a acquires the language information set in the browser (step 406) and requests the start of chatting while notifying the server 16 of the language information (step 407).

In this case, the server 16 recognizes the language used in the terminal 17a (step 408). Moreover, the server 16 defines a terminal message box Box_A for the chatting of the terminal 17a in which transmission messages from the terminal 17a and reception messages to the terminal 17a are described so as to be displayable in a time-series manner and correlates the use language (in this example, English) of the terminal 17a with the terminal message box Box_A (step 409).

When the user BB requests the start of chatting with the user AA using the terminal 17b (step 410), the terminal 17b acquires the language information set in the browser (step 411). Moreover, the terminal 17b requests the start of chatting while notifying the server 16 of the language information (step 412).

In this case, the server 16 recognizes the use language of the terminal 17b (step 413). The server 16 defines a terminal message box Box_B for the chatting of the terminal 17b in which transmission messages from the terminal 17b and reception messages to the terminal 17b are described so as to be displayable in a time-series manner and correlates the use language (in this example, Japanese) of the terminal 17b with the terminal message box Box_B (step 414).

When the terminal message boxes Box_A and Box_B of the terminals 17a and 17b are provided, the server 16 couples the terminal message box Box_A and the terminal message box Box_B (step 415).

When the terminal message box Box_A and the terminal message box Box_B are coupled, the server 16 translates the text of the transmission message written to the terminal message box Box_A defined in the terminal 17a using the use language (English) of the terminal message box Box_A as the translation source language and the use language (Japanese) of the terminal message box Box_B defined in the terminal 17b as the translation destination language and writes the translated text as the text of the reception message of the terminal message box Box_B. Moreover, the server 16 translates the text of the transmission message written to the terminal message box Box_B defined in the terminal 17b using the use language (Japanese) of the terminal message box Box_B as the translation source language and the use language (English) of the terminal message box Box_A defined in the terminal 17a as the translation destination language and writes the translated text as the text of the reception message of the terminal message box Box_A.

After that, when the user AA writes text (step 416), the text is transmitted from the terminal 17a to the server 16 as a transmission message (step 417), and the server 16 translates the text from English to Japanese immediately (step 418). Similarly, when the user BB writes text (step 419), the text is transmitted from the terminal 17b to the server 16 as a transmission message (step 420), and the server 16 translates the text from Japanese to English immediately (step 421). Once the coupling is set, since the translation source language and the translation destination language are not changed until the coupling is canceled, the server 16 can start translation of the written text immediately.

In this case, when the terminal 17 connects to the multilingual communication system 10 to set communication with a specific counterpart, the participating terminal connection unit 11 of the multilingual communication system 10 acquires the language information and defines a terminal message box for the terminal 17. Since the language information set to the terminals 17 is acquired and the terminal message boxes are defined, and the translations between the terminal message boxes are coupled when the terminals 17 start communication, translation can be performed immediately when texts are written.

The embodiments of the present invention are examples for describing the present invention and the scope of the present invention is not limited to these embodiments. Those skilled in the art can implement the present invention in various other forms without departing from the spirit of the present invention.

REFERENCE SIGNS LIST

10 Multilingual communication system
11 Participating terminal connection unit
12 Box coupling setting unit
13 Box coupling execution unit
14 Message storage unit
15 Translation learning unit
16 Server
17 Terminal
17a Terminal
17b Terminal
17c Terminal
21 Browser
22 Language information
23 Software
31 Operating system
32 Language information
33 Application software

The invention claimed is:

1. A multilingual communication system that provides translation-enabled terminal-to-terminal communication, the multilingual communication system comprising:
a server configured to:
before receiving a message that is to be translated:
connect a plurality of terminals participating in the communication including a first terminal and a second terminal,
acquire language information identifying a use language that is set in the first and second terminals at a time of connection when the first and second terminals connect to the multilingual communication system,
define a first message box for the first terminal and a second message box for the second terminal when the first terminal having connected to the multilingual communication system initiates communication with the second terminal, in which transmission messages and reception messages are displayed in a time-series manner in each of the first and second terminals,
correlate the use language of the first terminal with a first translation language of the first message box,
correlate the use language of the second terminal with a second translation language of the second message box, and
set coupling between the first message box and the second message box so that a transmission message written in the first terminal is translated based on: (i) the first translation language of the first message box as a translation source language, and (ii) the second translation language of the second message box as a translation destination language, wherein the coupling of the first and second message boxes includes selecting a dictionary based on the translation source language of the first message box and the translation destination language of the second message box;
receive the message that is to be translated when: (i) a transmission message is written in the first terminal, and (ii) after the first message box and the second message box are coupled together;
translate the transmission message from the translation source language to the translation destination language according to the coupling of the first and second message boxes; and
display the translated transmission message in the second terminal as a reception message.

2. The multilingual communication system according to claim 1, wherein
the server is configured to acquire the language information set to the terminal whenever connecting the terminal to the multilingual communication system.

3. The multilingual communication system according to claim 2, wherein
the first and second terminals include software that respectively operates on a browser of the first and second terminals, and
the server is configured to, when the software is activated, acquire the language information set in the browser of the respective first and second terminal, and connect the respective first and second terminal to the multilingual communication system.

4. The multilingual communication system according to claim 2, wherein
the first and second terminals include an application that operates on an operating system that is respectively installed in the first and second terminals, and
the server is configured to, when the application is activated in the respective first and second terminal, acquire the language information set in the operating system of the respective first and second terminal, and connect the respective first and second terminal to the multilingual communication system.

5. The multilingual communication system according to claim 1, further comprising:
a data storage memory configured to record data of messages translated by the first and second message boxes so as to be displayable in a time-series manner, in a database at a predetermined timing that is not synchronous with a writing timing.

6. The multilingual communication system according to claim 1, further comprising:
a data storage memory configured to record data of messages translated by the first and second message boxes so as to be displayable in a time-series manner, in a database at a predetermined timing that is different from a writing timing.

7. The multilingual communication system according to claim 1, wherein
the communication is a group chatting in which three or more users can participate, and
when a third terminal participates in a chatting group which is already set: (i) the server is configured to define a third message box for the third terminal for the chatting group, and (ii) the server is configured to set coupling in which the third message box of the third terminal is a transmitting side and the first and second message boxes are a receiving side, and coupling the third message box to the first and second message boxes such that the first and second message boxes are a transmitting side and the third message box is a receiving side.

8. The multilingual communication system according to claim 1, wherein
a reception message translated by the second message box of the second terminal is corrected from the second terminal, and
the data storage memory is configured to, when the reception message is corrected, store data in a database, the data correlating a message that is the reception message before translation, the reception message before correction, and the reception message after correction.

9. The multilingual communication system according to claim 8, wherein
the server is further configured to:
analyze the data that is stored in the database, and
update dictionary data in the first and second message boxes that is used for translation.

10. The multilingual communication system according to claim 1, wherein
the server is configured to automatically acquire the language information and define the second message box for the second terminal when the first terminal connects to the multilingual communication system and the first terminal sets communication with the second terminal.

11. A multilingual communication provision method for providing translation-enabled terminal-to-terminal communication, the multilingual communication provision method comprising:
before receiving a message that is to be translated:
connecting a plurality of terminals participating in the communication including a first terminal and a second terminal,
acquiring language information identifying a use language that is set in the first and second terminals at a time of connection when the first and second terminals connect to a multilingual communication server,
defining a first message box for the first terminal and a second message box for the second terminal when the first terminal having connected to the multilingual communication server initiates communication with the second terminal, in which transmission messages and reception messages are displayed in a time-series manner in each of the first and second terminals,
correlating the use language of the first terminal with a first translation language of the first message box,
correlating the use language of the second terminal with a second translation language of the second message box, and
setting coupling between the first message box and the second message box so that a transmission message written in the first terminal is translated based on: (i) the first translation language of the first message box as a translation source language, and (ii) the second translation language of the second message box as a translation destination language, wherein the coupling of the first and second message boxes includes selecting a dictionary based on the translation source language of the first message box and the translation destination language of the second message box;
receive the message that is to be translated when: (i) a transmission message is written in the first terminal, and (ii) after the first message box and the second message box are coupled together;
translating the transmission message from the translation source language to the translation destination language according to the coupling of the first and second message boxes; and
displaying the translated transmission message in the second terminal as a reception message.

12. The multilingual communication system according to claim 1, wherein the first message box for the first terminal and the second message box for the second terminal is defined only after the first terminal initiates communication with the second terminal via the multilingual communication system.

13. The multilingual communication provision method according to claim 11, wherein the first message box for the first terminal and the second message box for the second terminal is defined only after the first terminal initiates communication with the second terminal via the multilingual communication server.

\* \* \* \* \*